Sept. 20, 1966      S. W. ORR      3,273,537

WILDLIFE FEEDER

Filed Feb. 10, 1965

INVENTOR.
SAN W. ORR
BY Joseph G. Werner
Theodore J. Long
ATTORNEYS

United States Patent Office 3,273,537
Patented Sept. 20, 1966

3,273,537
WILDLIFE FEEDER
San W. Orr, Room 305, 122 W. Washington Ave.,
Madison, Wis.
Filed Feb. 10, 1965, Ser. No. 431,512
3 Claims. (Cl. 119—51)

My invention relates to an improved wildlife feeder.

One object of my invention is to provide a wildlife feeder for birds and animals which holds sufficient food for several days' feeding.

Another object of my invention is to provide such a feeder which prevents a bird or animal from removing all the food at once, yet continuously presents some of the food to the bird or animal for consumption at the feeder.

A further object of my invention is to provide such a feeder which is handy to use and economical to manufacture.

Other objects and advantages of my invention will be apparent from the following detailed description taken in conjunction with the accompanying drawings wherein a preferred embodiment of the principles of the invention has been selected for exemplification.

Figure 1:
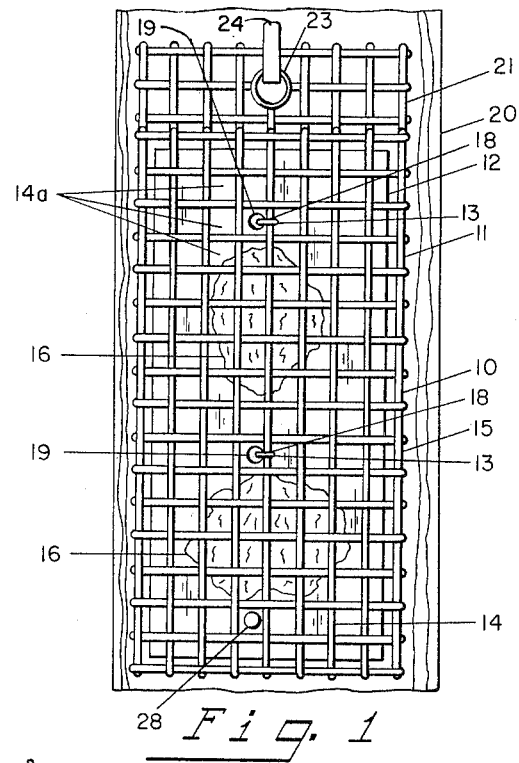
FIG. 1 is a front plan view of my novel animal feeder.

The basic elements of my bird feeder 10 include a meshed enclosure 11, a plate 12 and a plurality of compression springs 13.

A front screen 14 of meshed material and a continuous wall 15 define the enclosure 11. The screen 14 is preferably substantially flat. The wall 15, which may or may not be meshed, projects substantially perpendicularly from the perimeter of the screen 14. The illustrated screen 14 is substantially rectangular, and the enclosure 11 is thus in the form of a rectangular box. However, the screen 14 and the enclosure 11 may have any desired shape.

The plate 12 is approximately the same shape as the screen 14, but slightly smaller to permit it to slide within the continuous wall 15 and press against the screen 14 when the feeder 10 is empty.

The suet 16, or whatever other food is used, is held against the screen 14 by the plate 12. A bird or animal eats the suet 16 through the openings 14a in the screen 14 and, if present, through the openings 15a in the continuous wall 15. The size of the openings is determined by the size and nature of bird or animal to be fed.

The compression springs 13 secure the plate 12 to the screen 14, and continuously force the plate 12 toward the screen 14. The spring force presses the suet 16 against the screen 14, where it is constantly available to a feeding bird or animal. When the bird eats any of the suet 16, the remaining suet 16 is instantly pressed forward against the screen 14 by the force of the springs 13 acting on the plate 12. Yet the meshed construction of the enclosure 11 prevents the bird or animal from removing all the suet 16 at once.

Figure 2:
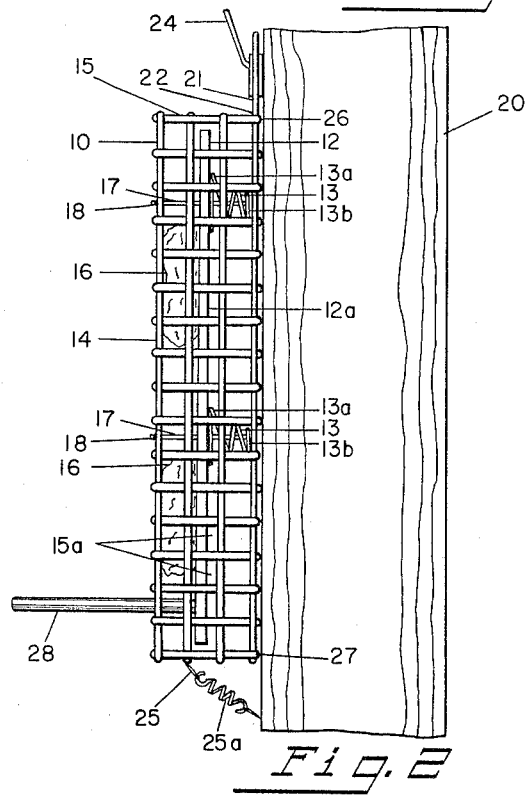
FIG. 2 is a side view of the feeder of FIG. 1.

Any arrangement of springs which achieves the above-described action is suitable. The arrangement shown is exemplary only. As illustrated in FIG. 2 the coiled compression springs 13 each have a bearing end 13a and a free end 13b. The springs 13 bear against the rear surface 12a of the plate 12, which surface 12a faces away from the screen 14. A shank 17 projects forwardly from the free end 13b of each spring 13 and terminates in a hook 18. Each shank 17 projects through an opening 19 in the plate 12 and an opening in the screen 14. The hooks 18 are of such size and curvature as to firmly engage screen 14 and secure the plate 12 thereto. The enclosure 11 preferably is sufficiently deep that the springs 13 do not project beyond the enclosure 11 even when the feeder 10 is filled with food.

My feeder 10 is typically attached to a tree 20 or other convenient structure. To aid the attachment, a panel 21, preferably of the same construction as the wall 15, may project from the top edge 22 of the wall 15. The panel 21 may preferably contain a grommet 23 through which a line 24, hook or other supporting member may be inserted. The line 24 may be tied to any convenient branch of the tree 20 or around the tree, or structure, whichever is most convenient.

The feeder 10 may be prevented from banging against the tree in the wind by securing a second line 25, which may preferably include an extension spring 25a or other resilient means to place the feeder 10 in tension, between the tree 20 and any lower portion of the feeder 10. If desired, the top and bottom rear edges 26 and 27, respectively, of the wall 15 may be contoured slightly to more closely conform to the circumference of the tree 20 against which said edges will bear, and thereby improve the stability of the feeder 10 in use.

If desired, my improved feeder 10 may have one or more perches 28 extending forwardly from the plate 12 through aligned openings 14a in the front screen 14. One such perch 28 having the shape of a slim rod is shown in the drawings. It is seen that such a perch 28 makes the suet 16 or other food in the feeder 10 more easily accessible to various birds and animals.

Any suitable materials may be used to construct my feeder 10. For example, the plate 12 may be plastic or aluminum. Hardware cloth or other wire mesh material is well suited for construction of the enclosure 11 and screen 14.

Filling my feeder 10 with food is a simple task. Assume initially that the enclosure 11, the plate 12 and the springs 13 are disassembled. Food is first placed within the enclosure 11 and pressed against the screen 14. Next the plate 12 is pushed against the food, thereby forcing the food against the screen 14. The shank 17 of each spring 13 is then inserted through an opening 19 in the plate 12 and an opening in the screen 14, and its hook 18 is engaged with the screen 14, as previously described. The filled feeder is then attached to or suspended from a tree or other object in a location accessible to the birds or animals to be fed. When the food is eaten, the feeder 10 is disassembled and the process repeated.

It is understood that my invention is not confined to the particular embodiment and arrangement of parts herein illustrated and described, but embraces all such modified forms thereof as come within the scope of the following claims.

I claim:

1. A wildlife feeder comprising:
   (a) an enclosure having a front screen made of shape retaining material and a continuous side wall connected thereto, said enclosure having an open back side,
   (b) said screen having a plurality of openings therein of sufficient size to permit wildlife to withdraw food from said enclosure therethrough,
   (c) a plate adapted to be removably positioned within said enclosure approximately parallel to said front screen, and
   (d) means spaced substantially within said enclosure and being detachably connected to said screen and bearing against the back of said plate for continually forcing said plate toward said screen, wherein the continuous side wall of the enclosure has a plurality of openings of sufficient size to permit wildlife to withdraw food from said enclosure therethrough, wherein the means for forcing the plate toward the front screen comprises a plurality of springs, each of said springs engaging the rear surface of said plate and having an integral wire extension connected to the front screen whereby to force said plate toward said screen.

2. The invention described in claim 1 wherein the plate has a plurality of openings, and wherein each of the springs has a bearing end adapted to bear against the rear surface of the plate, a free end, a shank extending forwardly from said free end and being adapted to extend through one of said openings in said plate, and a hook projecting from said shank and being adapted to engage the screen.

3. A wildlife feeder comprising:
(a) a screen enclosure having a front screen and a continuous side wall,
(b) said screen enclosure having a plurality of openings therein of sufficient size to permit wildlife to withdraw food from said enclosure therethrough,
(c) a plate adapted to be removably positioned within said enclosure such that wildlife food placed between said front screen and said plate will be held by said plate against said front screen, and
(d) a spring bearing against the back of said plate and having an integral wire extension thereof providing a shank extending through said plate and being detachably hooked to said front screen whereby to continually force said plate toward said front screen without obstructing said openings to maintain said food against said front screen as said food is gradually withdrawn from said enclosure by feeding wildlife.

References Cited by the Examiner
UNITED STATES PATENTS

| | | | |
|---|---|---|---|
| 1,092,314 | 4/1914 | White | 119—51 |
| 1,119,413 | 12/1914 | Dreibelbis | 119—60 |
| 1,123,501 | 1/1915 | Dreibelbis | 119—51 |

SAMUEL KOREN, *Primary Examiner.*
HUGH R. CHAMBLEE, *Examiner.*